May 17, 1938.                I. H. IHM ET AL.                2,117,327
                              BORING MACHINE
                          Filed March 12, 1935            2 Sheets-Sheet 1

Inventors
IVAN H. IHM
CHARLES F. TUTTLE by *J. W. Adams*
Attorney

Inventors
IVAN H. IHM
CHARLES F. TUTTLE
by *J. H. Adams*
Attorney

Patented May 17, 1938

2,117,327

UNITED STATES PATENT OFFICE 2,117,327

BORING MACHINE

Ivan H. Ihm and Charles F. Tuttle, Richmond, Calif., assignors to Standard Oil Company of California, San Francisco, Calif., a corporation of Delaware Application March 12, 1935, Serial No. 10,622

2 Claims. (Cl. 77—58)

This invention relates to a boring machine and more particularly to a boring machine tool which is adapted to be used for resurfacing and similar operations in restricted bores of heavy and relatively immovable equipment, such as pressure still headers which may be in place in a furnace.

Heretofore, it has been the practice, when machining operations are required on the grooves and the like of equipment such as pressure still headers, to remove them from their place in the furnace, and take them to a machine shop, where the machining is done. Inasmuch as these fittings are normally fixedly supported in the furnace and are further secured as firmly as possible to the tubes, to prevent leakage and blowing off due to internal pressure, this is a very expensive and inconvenient, as well as time consuming procedure. Certain types of alloy tubes are severely weakened and damaged by the heating which usually accompanies header removal, and in some cases where the tubes are welded to the headers, the tubes must be cut and destroyed, or at least shortened, before the headers can be taken off.

It is an object of this invention to provide a portable means for doing accurate field machine boring, and the like in heavy and relatively immovable equipment, such as pressure still headers.

Another object is to provide a means for accurately aligning and positioning a boring machine tool in a restricted bore to operate on the same.

Another object is to provide a compact and rugged cross-feed means for a boring tool of this type.

Another object is to provide a simple and accurate portable boring machine and guide means therefor adapted to remachine restricted bores.

These and other objects will be further apparent from the following description and from the appended drawings, which form a part of this specification and illustrate an example of a preferred embodiment of this invention. In the drawings.

Figure 1:
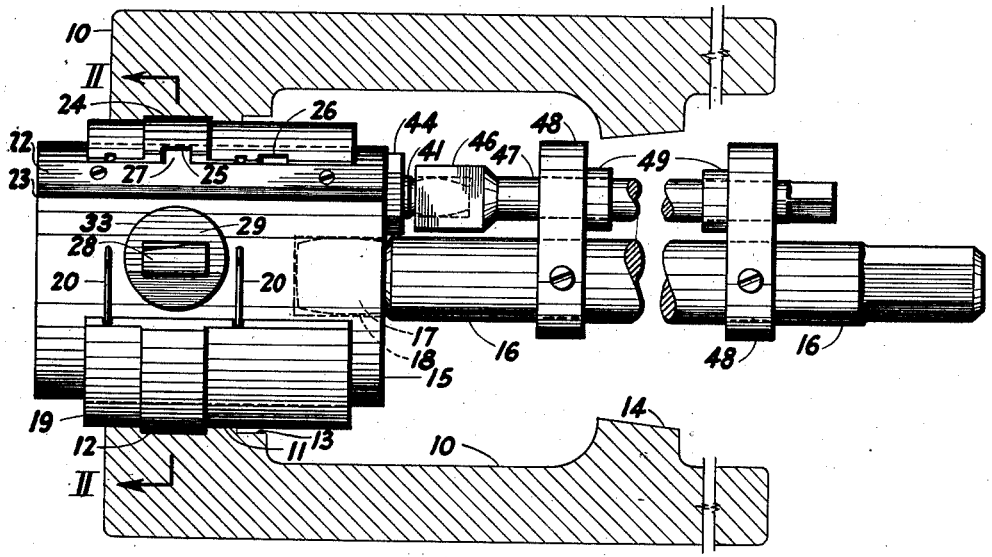
Figure 1 is a side elevation view of a boring tool in place in a header and adapted to remachine the grooves into which the tube is expanded.
Figure 2:
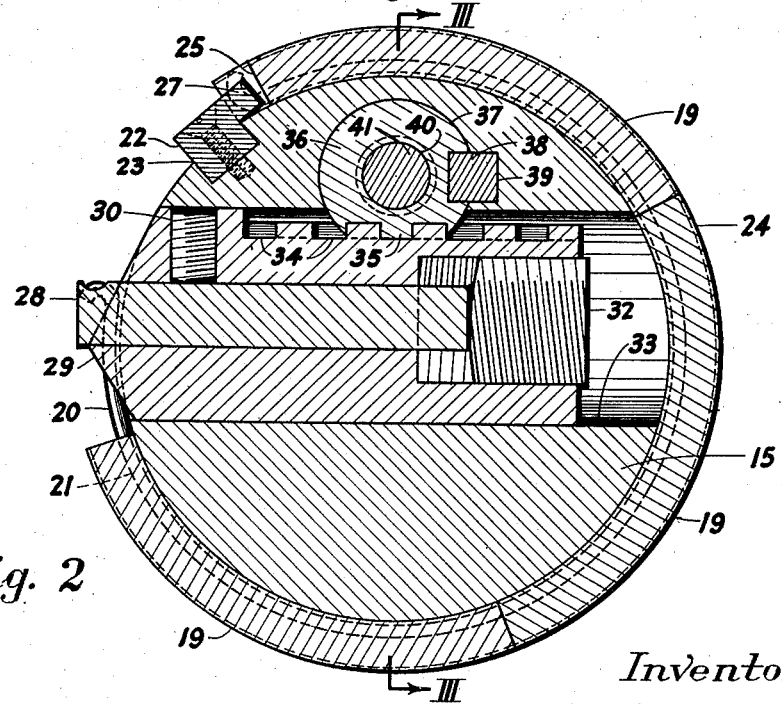
Figure 2 is a vertical sectional view on line II—II of Figure 1, and illustrates the tool holding, feeding, and guiding means of this embodiment.
Figure 3:
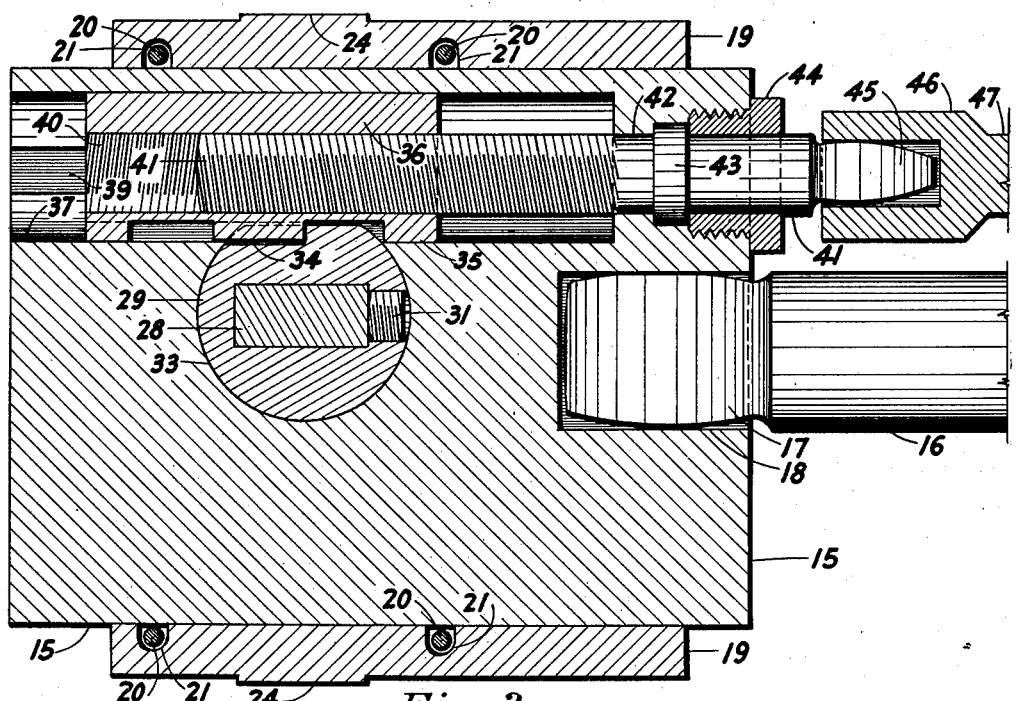
Figure 3 is a vertical longitudinal sectional view on line III—III of Figure 2.

Referring to the drawings and particularly to the grooving tool embodiment shown in Figures 1, 2 and 3, the numeral 10 indicates a header, diagrammatically shown here in section and provided with the usual tube seat bore 11, with grooves 12 and 13, into which a tube may be rolled or expanded into place in the conventional manner. The tapered seat 14, into which a cap or plug closure for the header is adapted to seat, forms with the tube seat, a restricted bore, which makes accurate machining operations on the grooves 12 and 13 particularly difficult.

The body 15 of the tool is generally cylindrical in shape and is provided with a turning or drive bar 16 which may be secured thereto permanently, or detachably as by the squared end 17 which is received in a corresponding square recess 18. A guide bushing 19 substantially surrounds body 15 and is preferably collapsible, in this case being made in three or more segments as shown, and is adapted to be first inserted in bore 11 in parts, and then assembled by means of spring wire retainers 20, which are snapped into grooves 21. It will be noted that the bushing subtends only about 300° of the body 15, in order to allow the cutting tool and the holder therefor to be extended radially to reach groove 12 or 13. This proportion has been found adequate to center the body 15 in bore 11.

Bushing 19 is carried around with tool body 15, by means of the longitudinal key 22 which is secured in a key seat 23 in the body. The periphery of bushing 19 is provided with a raised portion or ring 24, which engages groove 12, and aligns the bushing longitudinally in bore 11. There are two notches 25 and 26, in the trailing or driving edge of bushing 19, notch 25 being aligned with, or at least spaced from, groove 12, and notch 26 located in the same relation to groove 13. A lug 27 on key 22 engages either notch and aligns body 15 in bushing 19 to operate on whichever groove is to be machined.

Figures 5, 6:
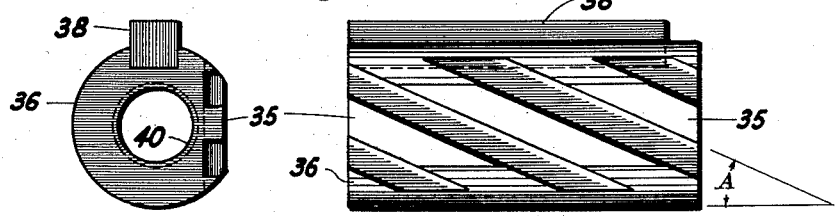
Figure 5 is an end view and Figure 6 a bottom view of the keyed feed bar used in these examples.
Figure 4:
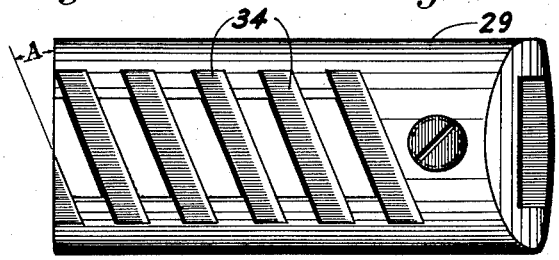
Figure 4 is a top view of the tool post used in these examples.

The cutting tool 28, for accomplishing the machining is secured in a generally cylindrical tool post or holder 29, as by set screws 30, 31 and 32. Holder 29 is received in a transverse bore 33 in body 15, and is movable longitudinally in said bore by means of inclined grooves 34 in which are received complementary inclined teeth 35 on a cylindrical feed bar or element 36 (Figures 4, 5 and 6.)

Feed bar 36 is positioned in longitudinal bore 37 in body 15 (Figures 2 and 3), and is prevented from rotating therein by a key 38, received in keyway 39. Feed bar 36 has an axial threaded bore 40 in which a correspondingly threaded feed screw 41 is received. Feed screw 41 extends into bore 37 through a smaller bore 42, and is prevented from moving longitudinally therein by flange 43, secured in body 15 by a threaded locknut 44. The outer end of feed screw 41, in the example shown, is squared as at 45 to be received in a correspondingly squared socket 46 on a removable extension member 47, which latter projects outwardly along drive bar 16 (Figure 1) to a point where both are accessible outside of header 10. Spacers 48 are provided to align and support feed screw extension member 47 and drive bar 16, the former being retained longitudinally therein by collars 49, and also being adapted to be rotated in spacers 48, which in turn are secured to bar 16.

In operation, guide bushing 19 is first set into bore 11, with ring 24 engaging groove 12. Body 15 is then inserted in bushing 19 and rotated to engage lug 27 on key 22 in notch 25 of bushing 19, if groove 12 is to be deepened. If groove 13 is to be operated on, lug 27 is engaged in notch 26. Cutting tool 28 is then moved outwardly into operative position by rotating feed screw 41, which, by virtue of its threaded engagement with the keyed feed bar 36, moves the latter longitudinally in bore 37, thus sliding tool holder 29 transversely due to the interaction of inclined teeth 35 in grooves 34.

In one example, with a tooth and groove angle "A" (Figures 4 and 6) of about 21 degrees 48 minutes and 5 seconds, which is a slope of 4.80 inches in 12 inches, and with a feed screw having 10 threads per inch, the tool was moved outwardly from body 15 a distance of 0.040 inch for each complete turn of the feed screw. Thus by rotating body 15 through the medium of drive bar 16, with a periodical partial rotation of the feed screw extension member 47, the machining of grooves 12 or 13 in bore 11 of the header 10 may be carried out uniformly, accurately, and to the depth desired.

It will be appreciated that this invention is adapted to other uses than that given, and may be described as involving a rotatable body carrying a generally transversely movable tool post and cutting tool, with means extending from said body for moving the tool post as may be required, and means for centering the body and also for guiding it in the path which it is desired the tool will take. While a specific construction has been described and illustrated to carry out these operations and functions, it is to be understood that the invention is not limited to that device, and all such modifications and changes as come within the scope of the appended claims are embraced thereby.

We claim:

1. A tube seat grooving tool comprising a body, a radially extensible cutter on said body, a guide means for said body comprising a longitudinally split bushing adapted to be received within said tube seat and to engage a groove therein, means for holding said bushing in place in said tube seat prior to the insertion of said body, and means selectively connecting said body and said guide means to space said body and said cutter longitudinally in said tube seat with regard to the groove engaged by said guide means.

2. A tube seat grooving tool according to claim 1 in which said bushing substantially encircles said body to align it centrally in said tube seat.

IVAN H. IHM.
CHARLES F. TUTTLE.